(12) United States Patent
Hiraike

(10) Patent No.: US 10,345,886 B2
(45) Date of Patent: Jul. 9, 2019

(54) IMAGE FORMING APPARATUS, METHOD FOR CONTROLLING IMAGE FORMING APPARATUS, AND STORAGE MEDIUM

(71) Applicant: CANON KABUSHIKI KAISHA, Tokyo (JP)

(72) Inventor: Kou Hiraike, Nagareyama (JP)

(73) Assignee: Canon Kabushiki Kaisha, Tokyo (JP)

(*) Notice: Subject to any disclaimer, the term of this patent is extended or adjusted under 35 U.S.C. 154(b) by 134 days.

(21) Appl. No.: 15/274,789

(22) Filed: Sep. 23, 2016

(65) Prior Publication Data

US 2017/0090553 A1    Mar. 30, 2017

(30) Foreign Application Priority Data

Sep. 29, 2015    (JP) .................. 2015-191130

(51) Int. Cl.
| | |
|---|---|
| *G06F 1/32* | (2019.01) |
| *H04N 1/00* | (2006.01) |
| *G06F 1/3234* | (2019.01) |
| *G06F 1/3231* | (2019.01) |
| *G06F 3/12* | (2006.01) |
| *G06F 1/3228* | (2019.01) |

(52) U.S. Cl.
CPC .......... *G06F 1/3284* (2013.01); *G06F 1/3228* (2013.01); *G06F 1/3231* (2013.01); *G06F 1/3265* (2013.01); *G06F 3/1221* (2013.01); *G06F 3/1229* (2013.01); *G06F 3/1285* (2013.01); *G06F 3/1292* (2013.01); *H04N 1/00411* (2013.01); *H04N 1/00506* (2013.01); *H04N 2201/0089* (2013.01); *H04N 2201/0094* (2013.01); *Y02D 10/153* (2018.01); *Y02D 10/159* (2018.01)

(58) Field of Classification Search
CPC .... G06F 1/3284; G06F 1/3231; G06F 1/3265; H04N 1/00411; H04N 1/00506
See application file for complete search history.

(56) References Cited

U.S. PATENT DOCUMENTS

| | | | | |
|---|---|---|---|---|
| 8,159,551 | B2* | 4/2012 | Katz | G06F 1/3203 348/222.1 |
| 8,635,475 | B2* | 1/2014 | Lin | G06F 1/3215 713/320 |
| 8,803,799 | B2* | 8/2014 | Hu | G06F 1/3218 345/156 |
| 8,918,662 | B2* | 12/2014 | Root | G06F 1/1632 710/15 |
| 2014/0139567 | A1* | 5/2014 | Jeon | G09G 5/10 345/691 |

FOREIGN PATENT DOCUMENTS

| | | |
|---|---|---|
| CN | 103838538 A | 6/2014 |
| JP | 5-188713 A | 7/1993 |
| JP | 2002-23564 A | 1/2002 |
| JP | 2009-157637 A | 7/2009 |

* cited by examiner

*Primary Examiner* — Stefan Stoynov
(74) *Attorney, Agent, or Firm* — Canon U.S.A., Inc. IP Division

(57) ABSTRACT

An image forming apparatus includes a display unit with a power saving function, where the display unit is turned off after a predetermined period of time has elapsed to save power. If however, the display unit is displaying a code used by external devices to establish communication with the image forming apparatus, the power saving function is disabled during the time period the code is being displayed.

17 Claims, 8 Drawing Sheets

US 10,345,886 B2

IMAGE FORMING APPARATUS, METHOD FOR CONTROLLING IMAGE FORMING APPARATUS, AND STORAGE MEDIUM

BACKGROUND

Field

Aspects of the present invention generally relate to an image forming apparatus including a power saving function of a display, and a method for controlling the image forming apparatus, and a storage medium.

Description of the Related Art

When a printing instruction is transmitted to an image forming apparatus, such as a multi-function peripheral (MFP), from a mobile device, such as a smartphone, via a network, a data transmission destination needs to be previously set in the mobile device. As a setting method, the data transmission destination is displayed as a bar code on an operation unit of the MFP, and the mobile device reads the bar code. According to such a setting method, a network setting and a network search need not be performed on the mobile device side, so that setting work can be simplified.

In recent image forming apparatuses, various functions have been prepared with respect to a setting at an image formation. For example, Japanese Patent Application Laid-Open No. 2002-23564 discusses an image forming apparatus that sets an auto clear time for each setting operation mode set by a user. The auto clear time is a time for automatically deleting contents set so far. Japanese Patent Application Laid-Open No. 5-188713 discusses a copying machine including an auto clear timer function for a guidance mode that is started by turning on a guidance key and has a setting time longer than that of a normal auto clear timer. Japanese Patent Application Laid-Open No. 2009-157637 discusses an information processing apparatus that automatically performs processing for shifting to a power saving operation mode when there is no input continuously for not shorter than a predetermined period of time. The power saving operation mode is a mode (function) for reducing power consumption by turning off a liquid crystal display (LCD) of a display panel.

When an image forming apparatus displays a setting content as a bar code and a mobile device reads the bar code, the display of the bar code can disappear before the reading of the bar code is completed. For example, when it takes time to start up and operate an application for reading the bar code in the mobile device, a power saving function can operate. As a result, the display is turned off, so that the display of the bar code disappears.

SUMMARY

According to an aspect of the present invention, an image forming apparatus includes a display unit configured to display a display screen and a control unit configured to turn off the display screen when a user operation has not been performed for a predetermined period of time, wherein, in a case where the display unit displays a code to be read by an external device, the control unit does not turn off the display screen even if the user operation has not been performed for the predetermined period of time.

Further features of aspects of the present invention will become apparent from the following description of exemplary embodiments with reference to the attached drawings.

DESCRIPTION OF THE EMBODIMENTS

Exemplary embodiments of the present invention will be described below with reference to the drawings.

Figure 1:
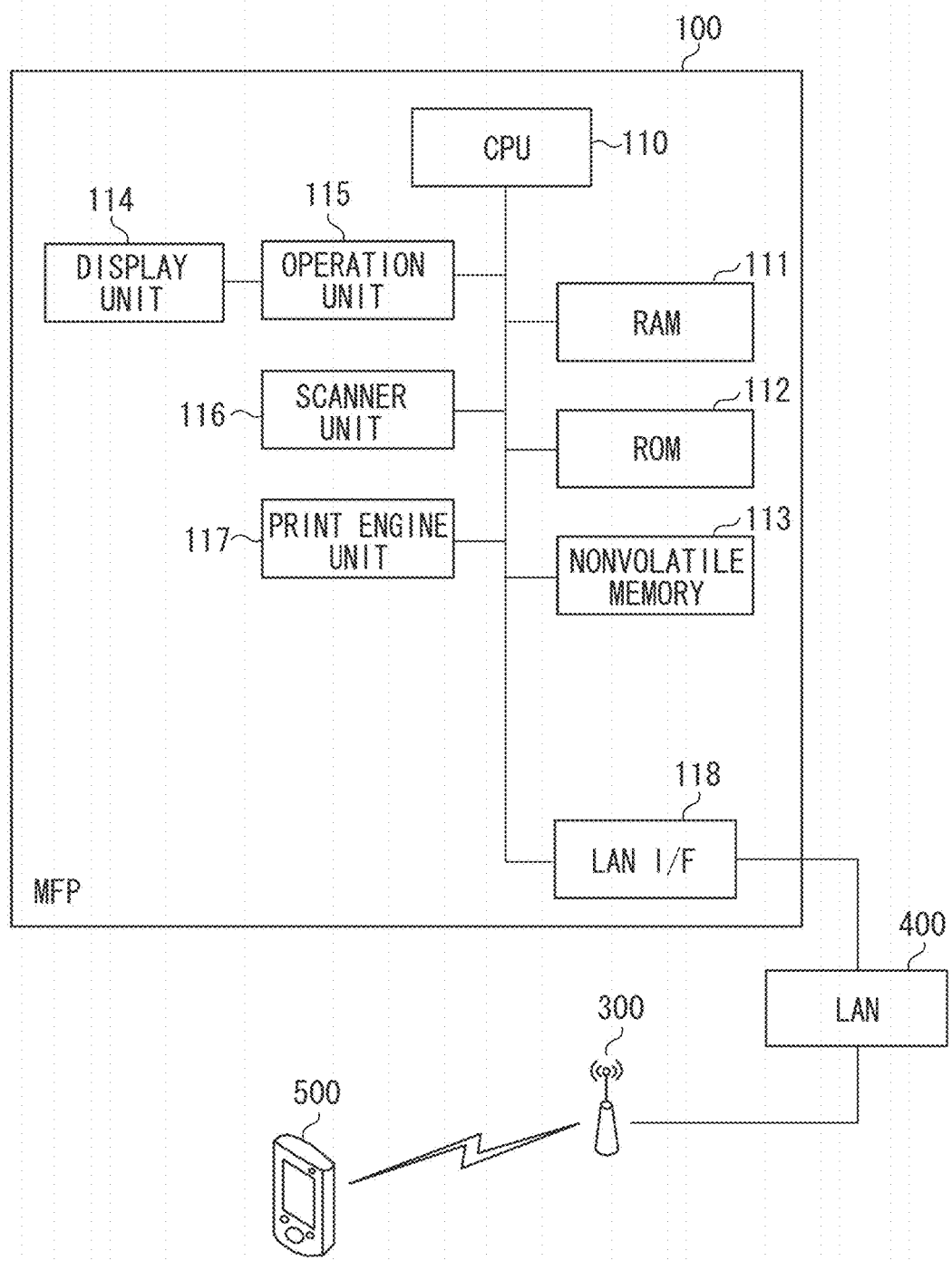
FIG. 1 is a block diagram illustrating a configuration of a multi function peripheral (MFP) according to a first exemplary embodiment.

In a first exemplary embodiment, an example in which a network-type multi-function peripheral (MFP) is used as an image forming apparatus including a communication function is illustrated. FIG. 1 is a configuration diagram of an MFP 100. The MFP 100 is configured by connecting a computer including a central processing unit (CPU) 110, a random access memory (RAM) 111, a read-only memory (ROM) 112, and a nonvolatile memory 113 to an internal bus. A display unit 114 is connected to the internal bus via an operation unit 115. A scanner unit 116, a print engine unit 117, and a local area network (LAN) interface (I/F) 118 are also connected to the internal bus.

The CPU 110 reads and executes a predetermined computer program (an MFP control program). Thus, the computer functions as an MFP control unit that integrally controls an operation of the MFP 100. The RAM 111 functions as a work memory for the MFP control program. The RAM 111 also functions as a buffer for temporarily storing an image to be printed out by the print engine unit 117. The ROM 112 stores a basic control program such as an operating system. When a rewritable flash ROM is used as the ROM 112, various types of programs (program codes) stored in the ROM 112 can also be updated. The nonvolatile memory 113 includes a hard disk drive (HDD) and a flash ROM. The above-described MFP control program is installed in the nonvolatile memory 113. The nonvolatile memory 113 also stores various types of setting data, a use history of the MFP 100, and an image file (filed image formation data).

The display unit 114 is a touch panel display that is a combination of a touch screen with a liquid crystal display (LCD), and functions as a display unit on which a setting screen is displayed. The operation unit 115 functions as an operation unit that receives a content operated via the setting screen displayed on the display unit 114. On the display unit 114, the display screen can be shifted to a predetermined state caused by starting up an auto clear function or a power saving function. The auto clear function is a function of clearing, when a state where a setting content, which is being input by the operation unit 115, has not yet been confirmed is continued for a predetermined period of time, the setting content. This function is prepared to prevent a subsequent user from using the unconfirmed setting. When the auto clear function starts to operate, the display screen automatically shifts to a predetermined screen previously determined, e.g., the first setting screen. The power saving function is a function of reducing the power consumption of the MFP 100 by turning off the LCD in the display unit 114. In other words, when an unoperated state is continued for a predetermined period of time while the display screen remains displayed, the power saving function is started up, so that the LCD is turned off.

The scanner unit 116 reads a document and converts the read document into an image file. The print engine unit 117 prints out the image file read by the scanner unit 116 or an image file received from an external device. The LAN I/F 118 is an interface for connecting to a local area network (LAN) 400. A mobile device 500 serving as an external device is connected to the LAN 400 via an access point 300. Thus, data can be transmitted and received between the MFP 100 and the mobile device 500.

Figure 2:
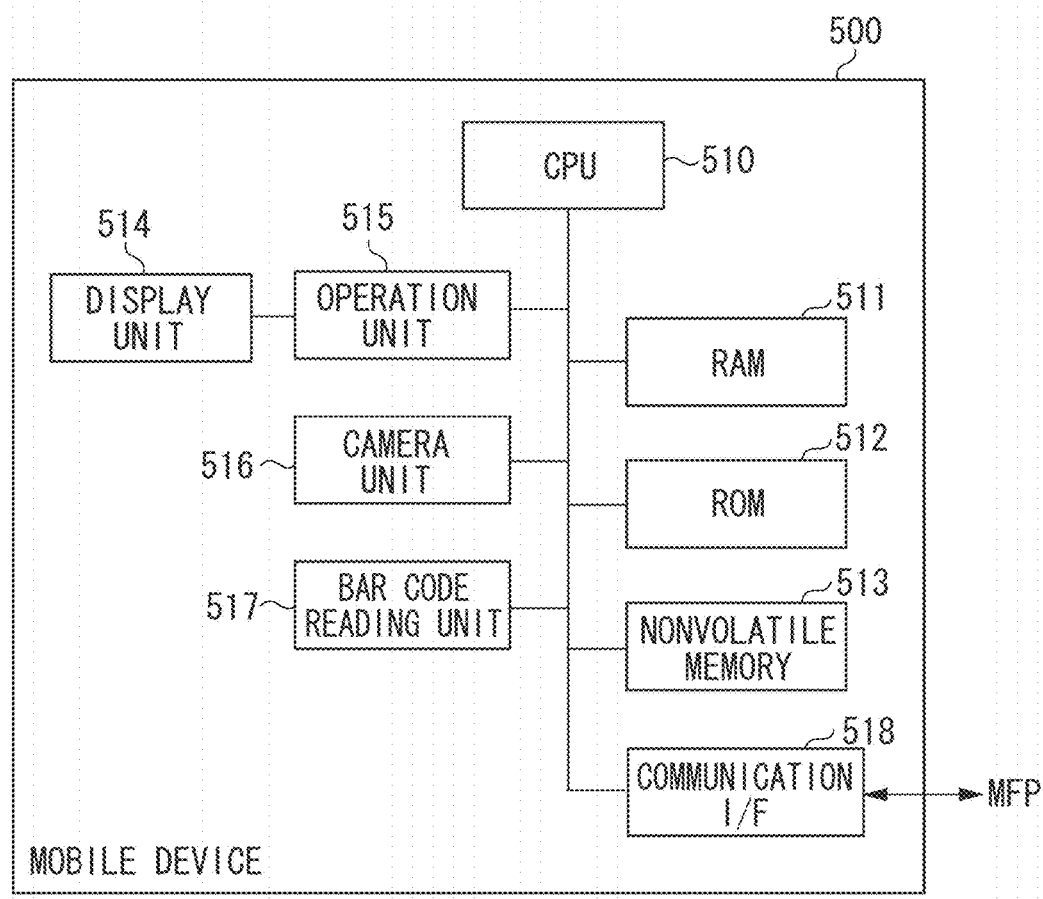
FIG. 2 is a block diagram illustrating a configuration of a mobile device serving as an example of an external device.

FIG. 2 is a configuration diagram of the mobile device 500 including a communication function and an image reading function. The mobile device 500 can be a smartphone, a tablet terminal, a personal computer, etc. The mobile device 500 is configured by connecting a computer including a CPU 510, a RAM 511, a ROM 512, and a nonvolatile memory 513 to an internal bus. A display unit 514 is connected to the internal bus via an operation unit 515. A camera unit 516, a bar code reading unit 517, and a communication I/F 518 are also connected to the internal bus.

The CPU 501 reads and executes a print control computer program (hereinbelow, referred to as a "printing application"). Thus, the computer functions as a print control unit that integrally controls an operation of the mobile device 500. The RAM 511 functions as a work memory when the printing application is executed. The RAM 511 also functions as a buffer for temporarily storing an image file captured by the camera unit 516 and predetermined information read by the bar code reading unit 517. The ROM 512 stores a basic control program such as an operating system. When a rewritable flash ROM is used as the ROM 512, various types of programs (program codes) stored in the ROM 512 can also be updated. The nonvolatile memory 513 includes a hard disk (HDD) and a flash ROM. The above described print control program is installed in the nonvolatile memory 513. The nonvolatile memory 513 also stores the image file captured by the camera unit 516.

The display unit 514 is a touch panel display that is a combination of a touch screen with an LCD, and various types of setting screens are displayed thereon. The operation unit 515 receives a content operated via the various types of setting screens displayed on the display unit 514. The bar code reading unit 517 automatically reads predetermined information from a barcode image captured by the camera unit 516. The predetermined information is a receiving destination address set when the MFP 100 is accessed by the mobile device 500 via a network in the present exemplary embodiment. The communication I/F 518 is an interface for communication with the MFP 100 via the LAN 400 (see FIG. 1). More specifically, the MFP 100 is accessed using the predetermined information read by a bar code reading function.

Figure 3:
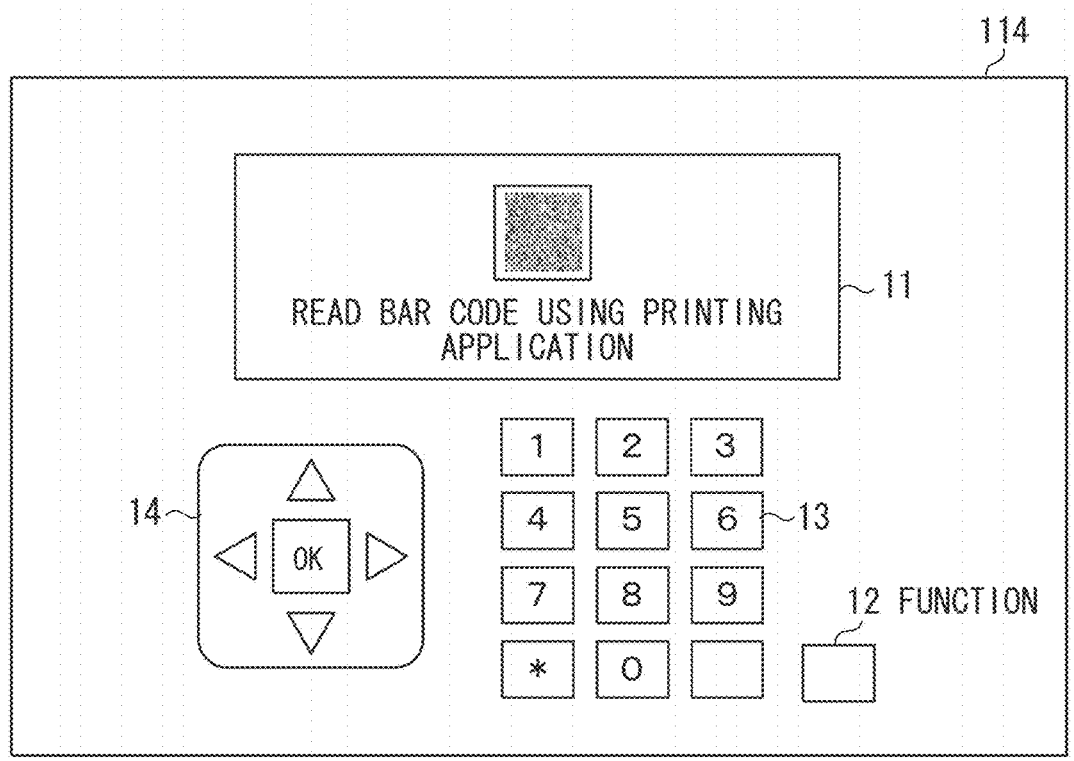
FIG. 3 illustrates an example of a display content in an operation unit in the MFP.
Figure 4:
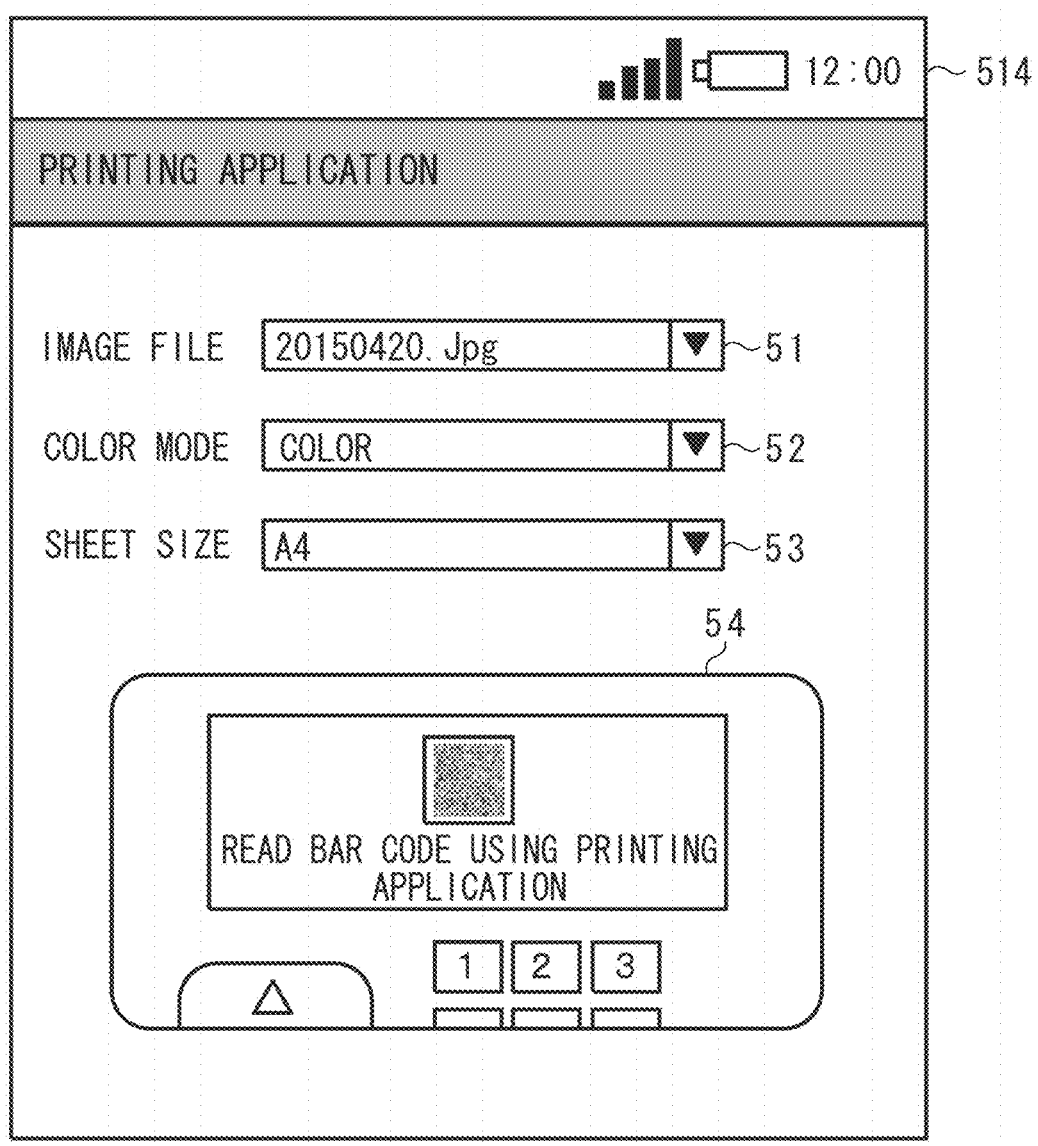
FIG. 4 illustrates an example of a display content in an operation unit in the mobile device.

FIG. 3 and FIG. 4 illustrate examples of display screens displayed by the MFP 100 and the mobile device 500 respectively. Turning to FIG. 3, a setting screen is displayed on the display unit 114 of the MFP 100. An image display area 11, a function selection area 12, a numeric keypad area 13, and a direction specifying area 14 are formed on a display screen of the display unit 114. A setting image of a function selected in the function selection area 12 is displayed in the image display area 11. Examples of the setting image of the function include a barcode image, a display set when the print engine unit 117 performs printing, and a display of a printing status. The numeric keypad area 13 is used to input the number of prints. The direction specifying area 14 is used to switch items in various types of images displayed in the image display area 11.

In the example illustrated in FIG. 3, a barcode image and an instruction to read the barcode image are displayed in the image display area 11. Information represented by the barcode image is a receiving destination address of an image file received via the network in the present exemplary embodiment. The receiving destination address is determined depending on a communication format to be used. Examples of the communication format include Hypertext Transfer Protocol (HTTP), File Transfer Protocol (FTP), and Server Message Block (SMB). As the receiving destination address, an electronic mail address or an Internet Protocol (IP) address can be used. The receiving destination address can be switched via the operation unit 115. When HTTP is used, a Uniform Resource Locater (URL) is converted into a barcode image. If the receiving destination address is switched, or a communication environment (a network setting content) of the MFP 100 is changed, the CPU 110 remakes the barcode image.

FIG. 4 illustrates an example of a display screen of the display unit 514 in the mobile device 500. A layout of the display screen is determined by a printing application. In the illustrated example, an image file selection area 51, a color mode setting area 52, a sheet size setting area 53, and an image area 54 are formed. In the image file selection area 51, an image file serving as image formation data to be transmitted to the MFP 100 is specified. The specified image file is output as print data. In the color mode setting area 52, whether the image file is printed in color or in monochrome is specified. In the sheet size setting area 53, a sheet size for the printing is specified. In the image area 54, an image captured by the camera unit 516 is displayed. If the captured image is a barcode image, its content is automatically read by the bar code reading unit 517, and is transmitted to the CPU 510.

A method for controlling the MFP 100, which is performed by the MFP 100 and the mobile device 500 configured as described above, will be described below. This control method includes an activation restriction step of an auto clear function performed on the MFP 100 side, a print data transmission step performed on the mobile device 500 side, and a step of canceling the restriction performed on the MFP 100 side. The print data is an image file serving as image formation data.

In the restriction step, the MFP 100 generates an image representing a receiving destination address of the print data, and displays the generated image on a display screen while restricting a shift of the display screen. In the transmission step, the mobile device 500 reads the receiving destination address from the image, and transmits the print data with the read receiving destination address to the MFP 100. In the cancel step, the MFP 100, which received the print data, cancels the restriction of the above described shift.

Figure 5:
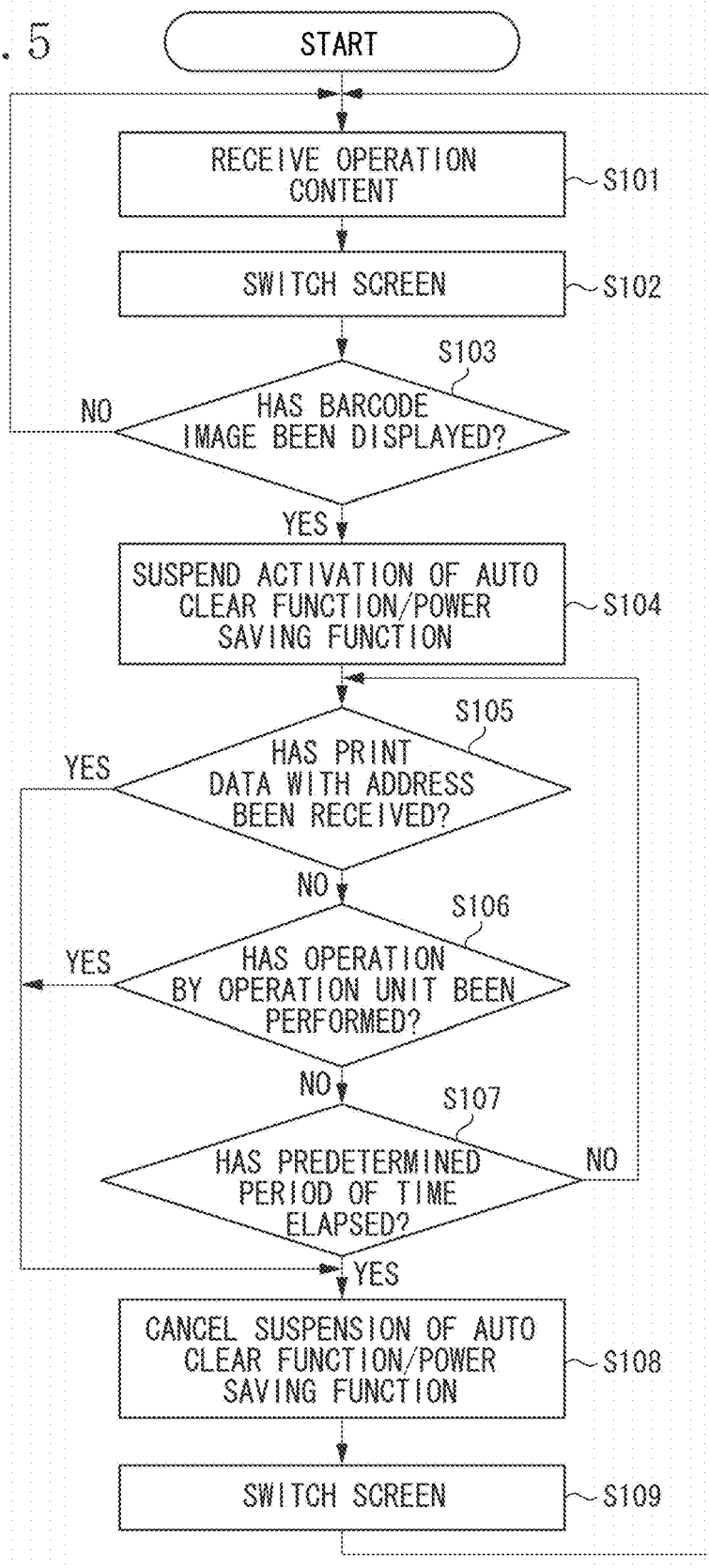
FIG. 5 is a flowchart illustrating an operation procedure on the MFP side according to the first exemplary embodiment.

Respective processing contents of the restriction step and the cancel step will be described with reference to FIG. 5. FIG. 5 illustrates a procedure for a main routine performed by the CPU 110 (MFP control unit). The CPU 110 starts a print control operation when the user operates the operation unit 115 if a print job is generated. More specifically, in step S101, the CPU 110 receives an operation content input to the operation unit 115 via the display screen illustrated in FIG. 3. In step S102, the CPU 110 switches a screen to be displayed in the image display area 11 of the display unit 114 according to the operation content. In step S103, the CPU 110 determines whether the received operation content is an operation for displaying a barcode image. If the operation content is the operation for displaying the barcode image (YES in step S103), the processing proceeds to step S104. In step S104, the CPU 110 displays the barcode image in the display unit 114. The CPU 110 also restricts a shift of the display screen for the auto clear function or the power saving function so that the barcode image does not disappear. Simply, in step S104, the CPU 110 suspends respective activations of the auto clear function and the power saving function, i.e., temporarily invalidates the auto clear function and the power saving function. The suspension of the activations of the functions is stored in the RAM 111. If the operation content is not the operation for displaying the barcode image (NO in step S103), the processing returns to step S101. The above-described processing is a content of the restriction step.

Typically, when a user operation remains unperformed for a predetermined period of time (e.g., 10 minutes), a display is turned off by the power saving function. When the power saving function is suspended by the process in step S104 (i.e., when the barcode image is displayed), even if the user operation remains unperformed for the predetermined period of time, the display is not turned off.

In step S105, the CPU 110 waits until the print data with the receiving destination address represented by the barcode image is received. If the print data has not been received (NO in step S105), the processing proceeds to step S106. In step S106, the CPU 110 determines whether an operation for switching display to another screen by the operation unit 115 has been performed. If the operation for switching display to another screen by the operation unit 115 has not been performed (NO in step S106), the processing proceeds to step S107. In step S107, the CPU 110 determines whether a predetermined period of time has elapsed in a state where the operation by the operation unit 115 is not performed. If the predetermined period of time has not elapsed in a state where the operation by the operation unit 115 is not performed (No in step S107), the processing returns to step S105. The CPU 110 repeats the processes in step S105 and the subsequent steps. The predetermined period of time can be a fixed period of time previously determined. Alternatively, the user can select the predetermined period of time from a plurality of options. However, a sufficient period of time is set before the barcode image is read.

If the print data has been received (YES in step S105), or if the operation for switching display to another screen by the operation unit 115 has been performed (YES in step S106), the processing proceeds to step S108. In step S108, the CPU 110 cancels restriction on the auto clear function and the power saving function i.e., validates the auto clear function and the power saving function that have been temporarily invalidated. If an access from the mobile device 500 has not been detected (the print data has not been received), and the predetermined period of time has elapsed in a state where the operation by the operation unit 115 is not performed (YES in step S107), the processing proceeds to step S108. More specifically, the CPU 110 cancels the restriction when the operation unit 115 has received an operation input before the access from the mobile device 500 is detected. The above-described processing is a content of the cancel step.

Processing performed in the cancel step is timer function processing for preventing the auto clear function and the power saving function from remaining suspended when the print data is not received from the mobile device 500 and the operation by the operation unit 115 is not performed.

If the cancel step in step S108 ends, then in step S109, the CPU 110 performs switching to a predetermined screen previously determined, e.g., the first setting screen, and performs switching to turn-off of the LCD when the power saving function has operated. Then, the processing returns to step S101.

Figure 6:
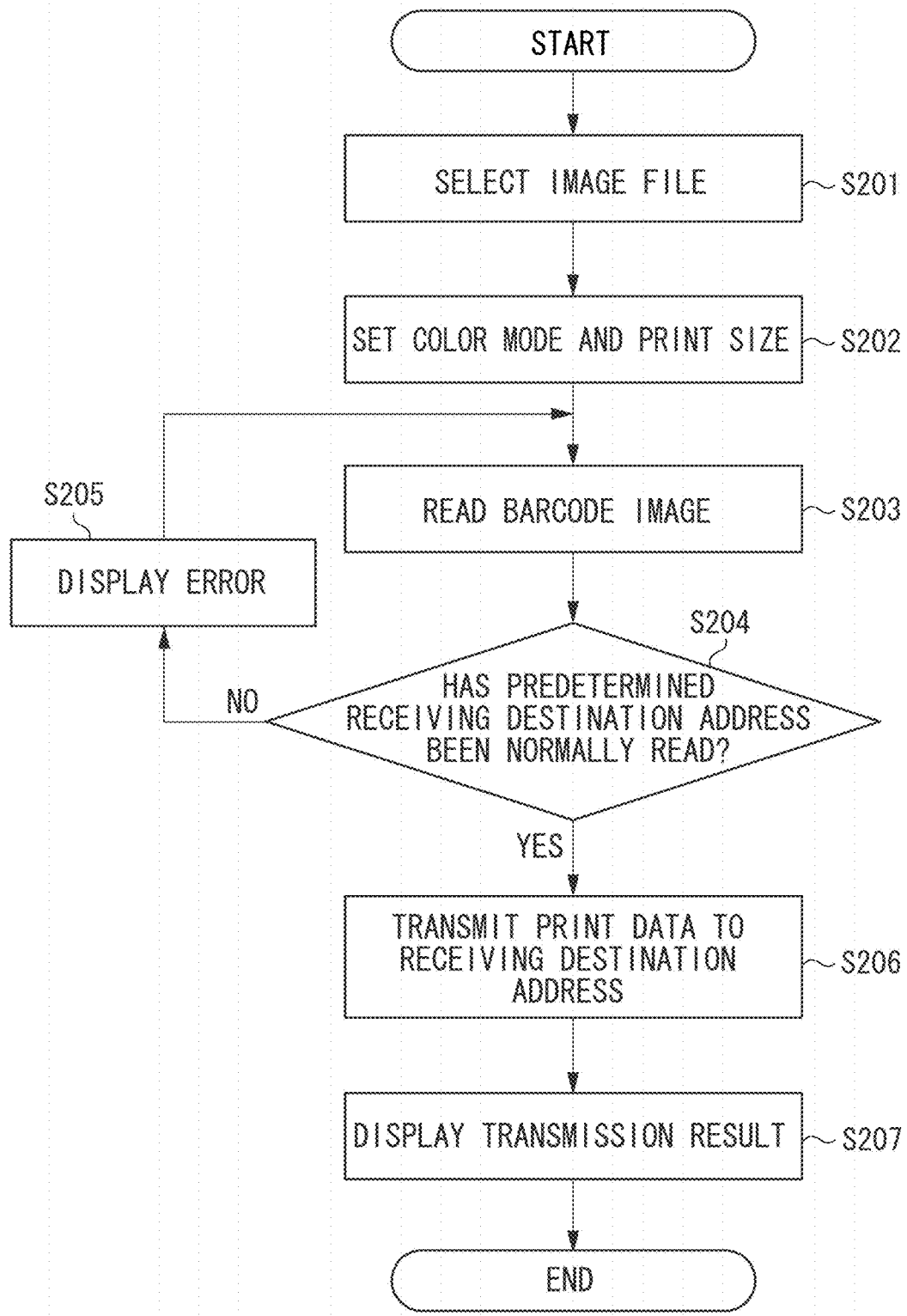
FIG. 6 is a flowchart illustrating an operation procedure of the mobile device according to the first exemplary embodiment.

FIG. 6 illustrates a procedure indicating a detailed content of the above described transmission step executed by the mobile device 500. The procedure illustrated in FIG. 6 is started when the CPU 510 detects a print job, i.e., activation of a printing application by the user. In step S201, the CPU 501 selects an image file to be printed from among image files stored in the mobile device 500 as print data when it detects an operation for the image file selection screen 51 on the display screen illustrated in FIG. 4. In step S202, the CPU 510 performs the print settings when it receives respective operation contents of the color mode setting 52 and the sheet size setting 53 illustrated in FIG. 4.

In step S203, when the user directs the camera unit 516 toward a barcode image displayed on the display unit 114 in the MFP 100 and an image captured by the camera unit 516 is displayed in the display area 54, the bar code reading unit 517 reads the barcode image, decrypts predetermined information represented by the barcode image, and transmits the decrypted predetermined information to the CPU 510. In step S204, the CPU 510 determines whether the information represented by the barcode image is a receiving destination address previously set in the MFP 100 from a reading result. If the information represented by the barcode image is not the receiving destination address previously set (NO in step S204), that is, if the receiving destination address has not been normally read, the processing proceeds to step S205. In step S205, the CPU 510 displays an error. Then, the processing returns to step S203. In step S203, the CPU 510 reads the barcode image again.

If the receiving destination address has been normally read (YES in step S204), the processing proceeds to step S206. In step S206, the CPU 510 transmits the image file (print data) selected in step S201 and setting information set in step S202 to the read receiving destination address. If HTTP is used as a protocol for communication between the MFP 100 and the mobile device 500, an HTTP PUT method is used to transmit the image file to the receiving destination address. In this case, the MFP 100 receives the image file using a POST method, and stores the received image file. The above-described processing is a content of the restriction step.

If the transmission ends normally, then in step S207, the CPU 510 displays an image transmission result to end the print job.

Figure 7:
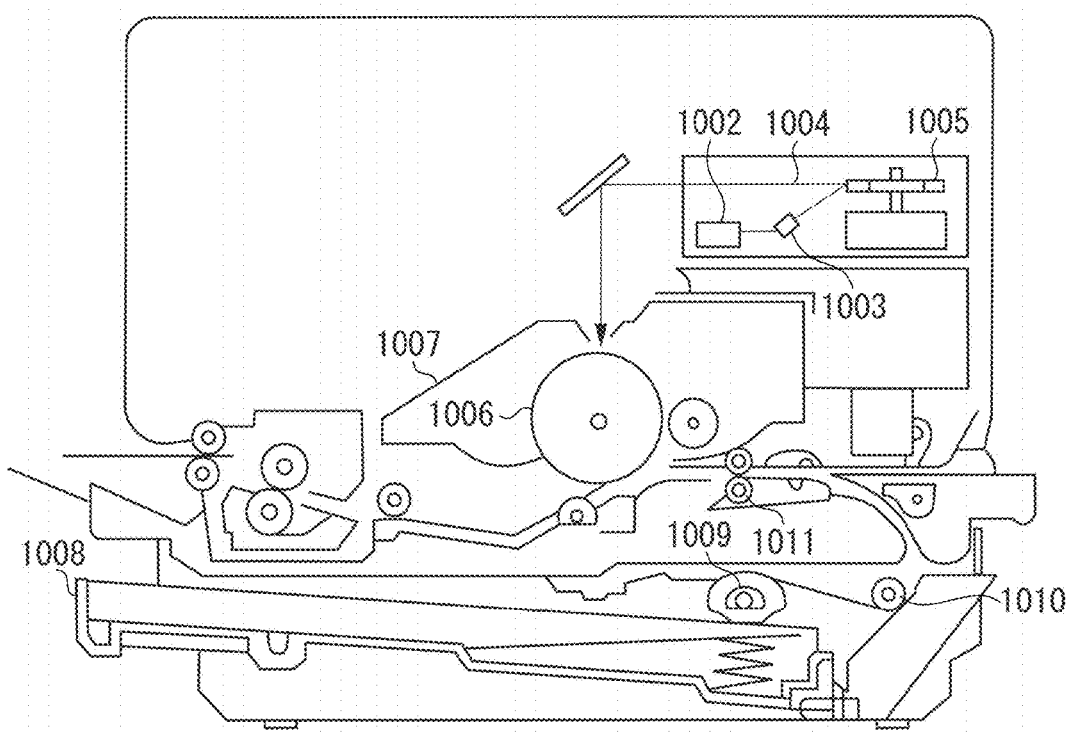
FIG. 7 is a cross-sectional view illustrating a schematic configuration of a print engine unit.

The outline of an operation of the printer engine unit 117 in the MFP 100, which executes the print job, will be described below. FIG. 7 is a schematic configuration diagram of the printer engine unit 117 using a laser beam printer system. The CPU 110 converts print data, which has been received from the mobile device 500 and stored in the MFP 100, into a video signal, and inputs the video signal into a laser driver 1002. The laser driver 1002 is a circuit for driving a semiconductor laser 1003, and switches on and off of a laser beam 1004 emitted from the semiconductor laser 1003 according to an input video signal. The laser beam 1004 is moved in a horizontal direction by a rotating polygon mirror 1005 to scan and expose an photosensitive drum 1006. In this way, an electrostatic latent image serving as an output image is formed on the photosensitive drum 1006. This latent image is developed by a developing unit 1007 disposed around the photosensitive drum 1006, and is then transferred onto a print sheet. The print sheet is stored in a print sheet cassette 1008, is taken in the MFP 100 by a feeding roller 1009 and conveyance rollers 1010 and 1011, and is fed into the photosensitive drum 1006.

The printer engine unit 117 can employ other printer systems such as an inkjet printer, a sublimation printer, and a silver halide printer in addition to the laser beam printer system.

Thus, in the present exemplary embodiment, when the MFP 100 displays the barcode image in the display unit 114, the auto clear function and the power saving function are correspondingly restricted until receipt of the print data from the mobile device 500 is detected. Thus, a situation where the display of the barcode image disappears before the mobile device 500 reads the barcode image and the barcode image is not easily recognized can be prevented from occurring. Thus, a communication setting content can be reliably transmitted to the mobile device 500 from the MFP 100.

While an example in which the timer function processing for suspending both the auto clear function and the power saving function, and then canceling the suspension is performed has been described as a form for restricting the auto clear function and the power saving function in the first exemplary embodiment, both the functions can be restricted without a timer function.

Figure 8:
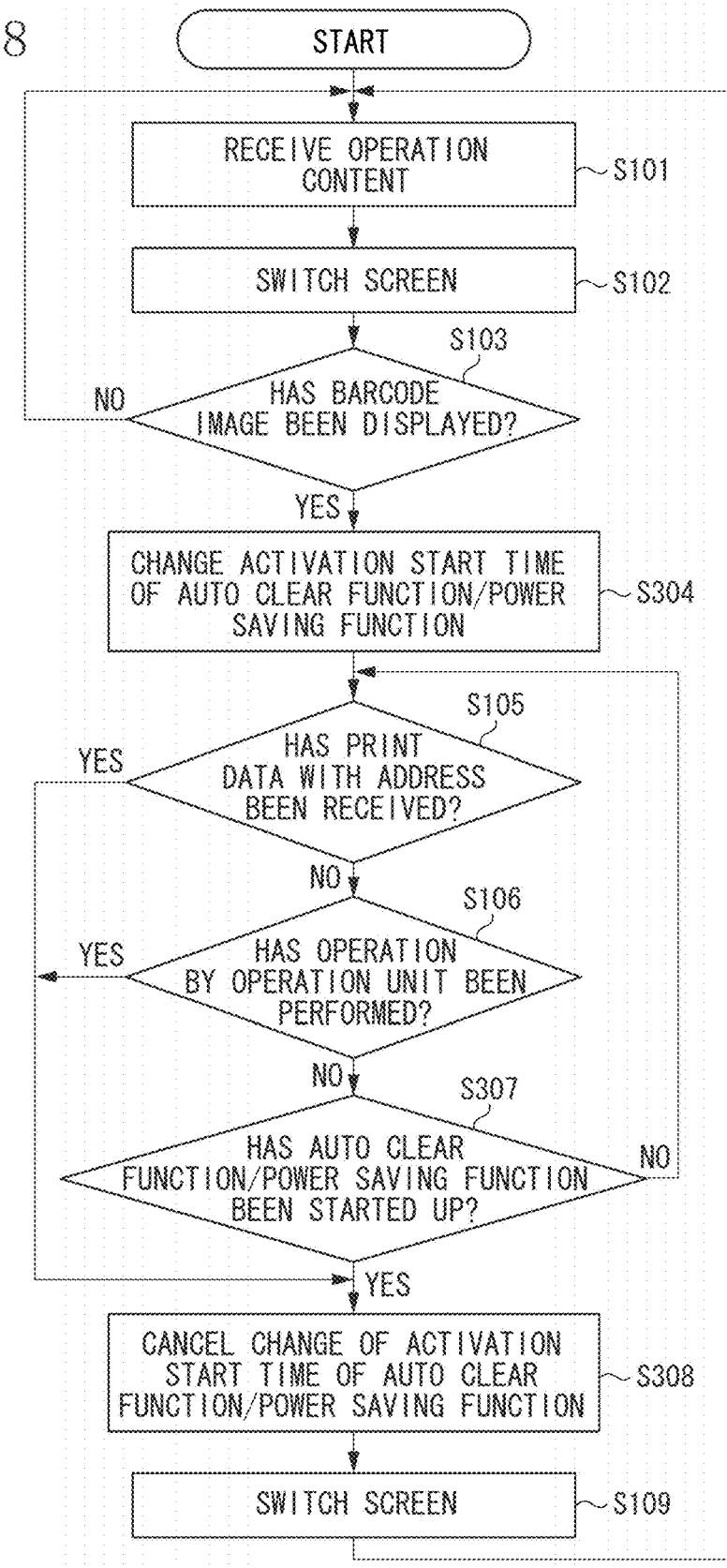
FIG. 8 is a flowchart illustrating an operation procedure of an MFP according to a second exemplary embodiment.

In a second exemplary embodiment, an example in which respective activation start times of an auto clear function and a power saving function are delayed will be described. FIG. 8 illustrates a procedure for a main routine executed by a CPU 110 (MFP control unit) according to the second exemplary embodiment. A procedure according to the second exemplary embodiment differs from the procedure according to the first exemplary embodiment illustrated in FIG. 5 in that steps S104, S107, and S108 are respectively changed to steps S304, S307, and S308. Other aspects of the procedure are the same as that illustrated in FIG. 5, and step numbers are the same as those illustrated in FIG. 5.

In step S304, the CPU 110 performs control to change the respective activation start times of the auto clear function and the power saving function to extend a display period of time of a barcode image in a display unit 114. While the activation start time of the auto clear function can be set to a minimum of 10 seconds, it can be shorter depending on a user requirement for starting up a printing application of a mobile device 500 to start printing. For example, the user can be at a location not in proximity to an MFP 100 or may not be able to easily start up the printing application. In such cases, when a timing at which the auto clear function is started up is temporarily changed to approximately 5 to 10 minutes after a barcode image is displayed, the user can have enough time to operate the MFP 100 to transmit print data to the MFP 100.

Similarly, the activation start time of the power saving function can be set to a minimum of one minute. However, when this setting value is temporarily changed to approximately 10 minutes, the user can have enough time to operate the MFP 100 to start printing. The user can previously set the degree of the activation start time delay. In step S307, the CPU 110 determines whether the auto clear function or the power saving-function has been started up. If the auto clear function or the power saving function has been started up (YES in step S307), the processing proceeds to step S308. In step S308, the CPU 110 cancels a change of the activation start time.

As described above, in the second exemplary embodiment, control to delay the respective activation start times of the auto clear function and the power saving function is performed. Therefore, the respective startups of the auto clear function and the power saving function can easily be restricted as needed.

[Modification]

While an example in which the predetermined information represented by the barcode image is the receiving destination address of the MFP 100 has been described in the first exemplary embodiment and the second exemplary embodiment, aspects of the present invention are not limited to this example. The mobile device 500 just needs to be notified of information for permitting an image forming operation on the MFP 100 side via a barcode image. Therefore, predetermined information can be authority information independently set by the MFP 100 and can be recognized on by the mobile device 500. Therefore, the predetermined information can be an image other than a barcode image.

While an example in which both the respective startups of the auto clear function and the power saving function are suspended and the respective activation start times thereof are delayed has been described in the first exemplary embodiment and the second exemplary embodiment, aspects of the present invention are not limited to this example. If the MFP 100 has only one of the auto clear function and the power saving function, it is sufficient to restrict the activation of the function. Aspects of the present invention are also applicable not only to the auto clear function and the power saving function, but also to a case where the display unit 114 shifts to a state where an image, which can be recognized by the mobile device 500, is prevented from being displayed.

In another exemplary embodiment, a display form of an image is controlled so that the visibility of the image is enhanced while the display unit 114 restricts a shift of a display screen. For example, the display form is controlled to increase an image contrast. Thus, the image can be more reliably recognized on the mobile device 500. The elapse of a period of time since the shift of the display screen was restricted can be measured, and the restriction can be automatically canceled when a state where an access from the mobile device 500 is not detected and an operation input is not received is continued for a predetermined period of time. In this way, a situation where the shift of the display screen is restricted in the display unit 114 for an excessively long period of time can be avoided. While an example in which the MFP 100 is used as the image formation apparatus has been described in the first exemplary embodiment and the second exemplary embodiment, the image formation apparatus can be an apparatus having only a local function, e.g., a printer.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-191130, filed Sep. 29, 2015, which is hereby incorporated by reference herein in its entirety.

What is claimed is:

1. An information processing apparatus capable of displaying a code image in which information is embedded, comprising:
a display unit;
a user interface configured to receive a user operation; and
a display controller configured to turn off the display unit based on a lapse of a predetermined period without receiving the user operation by the user interface,
wherein the display controller does not turn off the display unit based on the lapse of the predetermined period without receiving the user operation by the user interface if the code image is displayed on the display unit and turns off the display unit based on a lapse of another predetermined period that is longer than the predetermined period without receiving the user operation by the user interface even though the code image is displayed on the display unit.

2. The information processing apparatus according to claim 1, wherein the code image is a barcode image or a QR code image.

3. The information processing apparatus according to claim 1, wherein information for accessing the information processing apparatus via a network is embedded in the code image.

4. The information processing apparatus according to claim 1, wherein the display controller controls the display unit in such a way as to enhance visibility of the code image.

5. The information processing apparatus according to claim 4, wherein the display controller adjusts contrast of the code image.

6. The information processing apparatus according to claim 1, wherein the display controller performs switching from a screen that contains the code image to another screen when the user operation is received by the user interface before a lapse of the another predetermined period.

7. The information processing apparatus according to claim 1, further comprising:
a network interface configured to receive print data transmitted by an external apparatus;
wherein the display controller performs switching from a screen that contains the code image to another screen when the print data is received by the network interface before a lapse of the another predetermined period.

8. A display control method for turning off a display unit based on a lapse of a predetermined period without receiving a user operation by a user interface, the method comprising:
displaying a code image on the display unit; and
not turning off the display unit based on the lapse of the predetermined period without receiving the user operation by the user interface if the code image is displayed and turning off the display unit based on a lapse of another predetermined period that is longer than the predetermined period without receiving the user operation by the user interface even though the code image is displayed.

9. The method according to claim 8, wherein the code image is a barcode image or a QR code image.

10. An information processing apparatus capable of displaying a code image in which information is embedded, comprising:
a display unit;
a user interface configured to receive a user operation; and
a display controller configured to display a predetermined screen on the display unit based on a lapse of a predetermined period without receiving the user operation by the user interface,
wherein the display controller does not display the predetermined screen on the display unit based on the lapse of the predetermined period without receiving the user operation by the user interface if the code image is displayed on the display unit and displays the predetermined screen on the display unit based on a lapse of another predetermined period that is longer than the predetermined period without receiving the user operation by the user interface even though if the code image is displayed on the display unit.

11. The information processing apparatus according to claim 10, wherein the code image is a barcode image or a QR code image.

12. The information processing apparatus according to claim 10, wherein information for accessing the information processing apparatus via a network is embedded in the code image.

13. The information processing apparatus according to claim 10, wherein the display controller controls the display unit in such a way as to enhance visibility of the code image.

14. The information processing apparatus according to claim 13, wherein the display controller adjusts contrast of the code image.

15. The information processing apparatus according to claim 10, wherein the display controller performs switching from a screen that contains the code image to another screen when the user operation is received by the user interface before a lapse of the another predetermined period.

16. The information processing apparatus according to claim 10, further comprising:
a network interface configured to receive print data transmitted by an external apparatus;
wherein the display controller performs switching from a screen that contains the code image to another screen when the print data is received by the network interface before a lapse of the another predetermined period.

17. A display control method for displaying a predetermined screen on a display unit based on a lapse of a predetermined period without receiving a user operation by a user interface, the method comprising:
displaying a code image on the display unit; and not displaying the predetermined screen on the display unit based on the lapse of the predetermined period without receiving the user operation by the user interface if the code image is displayed on the display unit and displaying the predetermined screen on the display unit based on a lapse of another predetermined period that is longer than the predetermined period without receiving the user operation by the user interface even though the code image is displayed on the display unit.

\* \* \* \* \*